United States Patent Office 3,365,463
Patented Jan. 23, 1968

3,365,463
PROCESS FOR THE PRODUCTION OF DYESTUFFS
Manfred Groll, Cologne-Stammheim, Kurt Triebeneck, Cologne-Deutz, and Werner Theuer, Leverkusen, Germany, assignors to Farbenfabriken Bayer Aktiengesellschaft, Leverkusen, Germany, a corporation of Germany
No Drawing. Filed Sept. 17, 1965, Ser. No. 488,253
Claims priority, application Germany, Sept. 29, 1964, F 44,084
6 Claims. (Cl. 260—314.5)

ABSTRACT OF THE DISCLOSURE

Novel dyestuffs which have the general formula:

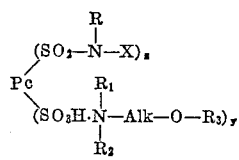

wherein Pc is a metal-containing phthalocyanine radical, R is a hydrogen atom, a lower alkyl or lower hydroxyalkyl group, $z$ is 1 or 2, $y$ is 1, 2, or 3, $R_1$ and $R_2$, which may be the same or different, are hydrogen atoms or lower alkyl radicals, Alk is an alkylene chain containing two or three carbon atoms and $R_3$ is an alkyl radical containing 6 to 14 carbon atoms, are prepared by reaction of metal containing phthalocyanine containing at least one free sulphonic acid group with an amine. The dyestuffs are of particular utility in the preparation of inks.

DISCLOSURE

The present invention is concerned with new dyestuffs of the phthalocyanine series and with the production thereof.

We have found that valuable dyestuffs of the phthalocyanine series are obtained when metal-containing phthalocyanines which contain free sulphonic acid groups and at least one sulphonamide group, the amide nitrogen of which is subsituted by one or two hydroxyalkyl groups, are reacted with amines of the general formula:

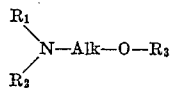

wherein $R_1$ and $R_2$, which may be the same or different, stand for hydrogen atoms or a lower alkyl radicals, Alk stands for an alkylene chain containing two or three carbon atoms, and $R_3$ stands for an alkyl radical containing six to fourteen carbon atoms.

The metal-containing phthalocyanines to be used according to the present invention as starting materials may contain, for example, copper, nickel or cobalt. These phthalocyanines preferably contain one to three sulphonic acid groups which may be in the 3- or 4-position of the phthalocyanine molecule. The sulphonamide group is likewise linked directly with the phthalocyanine molecule and may also be in the 3- or 4-position of the phthalocyanine molecule. The amide nitrogen of the sulphonamide group may contain one or two alkyl groups with the proviso that at least one alkyl group contains at least one hydroxyl group. The alkyl radical may, however, also contain several hydroxyl groups, for example, two or three hydroxyl groups. These alkyl radicals preferably contain up to 6 carbon atoms.

Examples of hydroxyalkyl groups of this type are 2-hydroxy-ethyl, 3-hydroxy-propyl, 1,3-dihydroxy-isobutyl, 3-hydroxy-butyl, trihydroxy-isobutyl and 6-hydroxy-n-hexyl radicals.

Examples of amines of the specified type are: 3-(2'-ethylhexoxy) - propyl - 1 - amine, 3 - (hexoxy) - propyl-1 - amine, 3 - (3',5',5" - trimethylhexoxy) - propyl - 1-amine and the amine which is obtained by the condensation of tri-isodecanol with acrylonitrile and reduction of the nitrile group. (In this context the term "tri-isodecanol" refers to the $C_{13}$ alcohol mixture which is obtained by condensing 3 mol butylene and subjecting the condensation product to an oxo synthesis.)

The production of the new dyestuffs obtained according to the present invention is carried out by reacting the phthalocyanine-sulphonic acids containing hydroxyalkyl-sulphonamide groups, or their alkali metal salts, with the amines or their salts, such as the acetates or hydrochlorides. The reaction is preferably carried out in an aqueous solution or suspension, but it is also possible to operate in other inert solvents, for example, alcohols. If the reaction is carried out in an aqueous medium, it is expedient to maintain the pH value of the reaction mixture obtained below 7 in order to prevent the reaction products from sintering together. The amines are expediently used in amounts sufficient for all free sulphonic acid groups to be converted into the corresponding amine salts, but it is also possible to work with an excess of amine.

The dyestuffs obtained have a particularly good solubility in polyglycols. On the other hand, the compounds are insoluble or only hardly soluble in water. The dyestuff salts according to the present invention are particularly well suited for the production of pastes for ball point pens based on polyglycols.

The following examples are given for the purpose of illustrating the present invention, the parts being by weight:

Example 1

57.5 parts copper-phthalocyanine are dissolved in 205 parts chlorosulphonic acid, while slowly raising the temperature to 130° C. The reaction mixture is stirred at 136 to 138° C. for one hour. Stirring is subsequently continued at 136 to 138° C. for 2 hours, the melt is cooled to 90 to 95° C. within the course of one hour and stirred at 90 to 95° C. for one hour. During this reaction time of 4 hours, 98 parts thionyl chloride are allowed to run in continuously. The reaction mixture is then stirred at 90 to 95° C. until the formation of the sulphochloride is completed. After cooling, the melt is poured on to ice and the copper-phthalocyanine-3,3',3",3'''-tetrasulphochloride is filtered off with suction and washed with ice water until neutral.

The sulphochloride paste thus obtained is slurried in 1000 parts water. 11 parts propanolamine and 0.6 part pyridine are then added. To form the sulphamide, the reaction mixture is stirred at 20 to 25° C., while slowly adding 150 parts of an 1 N sodium hydroxide solution and maintaining the pH value of the suspension at 9.0 to 9.6. When the reaction is completed, the mixture is heated to 80° C. and the residual sulphonic acid chloride groups are hydrolysed with a sodium hydroxide solution. After acidification with hydrochloric acid, the precipitated copper-phthalocyanine-sulphonic acid is filtered off with suction, thoroughly washed with dilute hydrochloric acid and dried.

49 parts 3-(2'-ethylhexoxy)-propyl-1-amine are dissolved in 1000 parts water, with the addition of acetic acid, and the solution is adjusted to a pH value of 7.5. To this solution there is slowly added, while stirring, a solution of the copper-phthalocyanine-sulphonic acid obtained above, and substituted by hydroxy-propyl-sulphamide groups, in 1000 parts water. The suspension obtained is subsequently stirred at 50 to 60° C. for a further 1 to 2 hours, suction-filtered and the filtered material washed with 1500 parts water and dried at 70–80° C.

The dyestuff thus obtained in excellent yield dissolves in 2 to 3 parts by volume of polyethylene glycol. The dyestuff obtained can be characterised by the following formula:

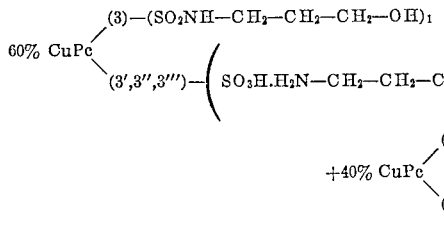

When the propanolamine used in paragraph 2 is replaced by equimolecular amounts of ethanolamine or butanol-1,3-diamine, dyestuffs of similar solubility in polyethylene glycol are obtained.

Example 2

57.6 parts copper-phthalocyanine are dissolved in 210 parts chlorosulphonic acid, while slowly raising the temperature to 110° C. The melt is subsequently stirred at 113 to 115° C. until approximately 3 sulphonic acid or sulpho-chloride groups have entered into the phthalocyanine molecule. 65 parts thionyl chloride are then allowed to run in within the course of 2 hours, while stirring. When the formation of the sulpho-chloride is completed, the reaction mixture is cooled and the melt poured on to ice. The precipitated copper-phthalocyanine-3,3′,3″-trisulphonic acid chloride is filtered off with suction and washed with ice water until neutral.

The copper-phthalocyanine-sulphonic acid chloride paste thus obtained is slurried in 1000 parts water. 8.2 parts propanol-1,3-diamine and 0.5 part pyridine are subsequently added. 110 parts 1 N sodium hydroxide solution are then added at 20 to 25° C., with stirring, so that the pH value of the suspension is about 9.0 to 9.6. When the formation of sulphamide is completed, the reaction mixture is heated to 80° C. The residual sulphonic acid chloride groups are hydrolysed by the addition of sodium hydroxide solution. The reaction mixture is subsequently acidified and the precipitated copper-phthalocyanine-3,3′,3″-monohydroxypropyl-sulphamido-disulphonic acid is filtered off with suction, washed with dilute hydrochloric acid, and dried.

37 parts 3-(2′-ethylhexoxy)-propyl-1-amine are dissolved in 1000 parts water, with the addition of acetic acid, and the solution is adjusted to pH 7.5. The copper-phthalocyanine - 3,3′,3″ - monohydroxypropyl-sulphamido-disulphonic acid obtained above and dissolved in 2000 parts water, is then slowly added. The mixture is then further stirred at 50 to 60° C. for several hours and the product is suction-filtered and washed with water. The 3-(2′-ethyl)-hexoxypropyl-1-amine salt of copper-phthalocyanine - 3,3′,3″ - monohydroxy-propylamido-disulphonic acid thus obtained in good yield is dried at 70 to 80° C. The dyestuff is excellently soluble in polyglycols; it can be characterised by the following formula:

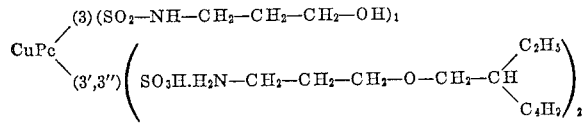

Similar dyestuffs are obtained when the propanol-1,3-diamine used in paragraph 2 is replaced by equimolecular amounts of ethanolamine or butanol-1,3-diamine.

Example 3

50 parts 3-(2′-ethylhexoxy)-propyl-1-amine are dissolved in 1000 parts water with acetic acid and the solution is adjusted to pH 7.5. To this solultion there is slowly added, while stirring, a solution of 30 parts copper-phthalocyanine-3,3′,3″ - dihydroxypropyl - sulphamido-monosulphonic acid and 68 parts copper-phthalocyanine-3,3′,3″-monohydroxy - propyl - sulphamindo-disulphonic acid in 2000 parts water. The reaction mixture is subsequently further stirred for 2 hours at 50 to 60° C. and the product suction filtered and washed with water. The dyestuff is excellently soluble in polyglycols. It is eminently suitable for the production of ball point pen pastes based on polyglycols. The dyestuff can be characterised by the following formula:

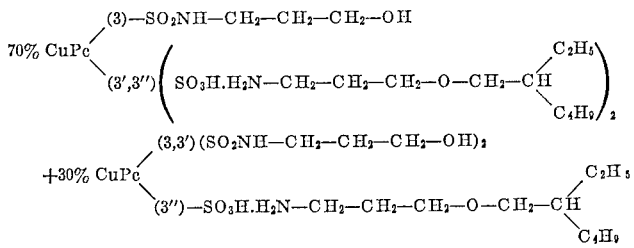

Example 4

The sulphonic acid chloride paste of copper-phthalocyanine-3,3′,3″,3‴-tetrasulphonic acid chloride obtained according to paragraph 1 of Example 1, is slurried in 1000 parts water. 11 parts propanol-1,3-diamine and 0.6 parts pyridine are then added. To form the sulphamide, the reaction mixture is stirred at 20 to 25° C., while slowly adding 150 parts 1 N sodium hydroxide solution and maintaining the pH value of the suspension at 9.0 to 9.6. When the reaction is completed, the reaction mixture is heated to 80° C. and the residual sulphonic acid chloride groups are hydrolysed with a sodium hydroxide solution. The reaction mixture is cooled to 20 to 30° C. and acidified with hydrochloric acid until the pH is 2.0 3-(2′-ethylhexoxy)-propyl-1-amine is then slowly added with stirring until the pH value of the suspension has reached 5.5 to 6.0. Stirring is continued at a slightly elevated temperature for several hours and the product is filtered off with suction, washed with water and dried at 70 to 80° C.

The dyestuff obtained in excellent yield is excellently soluble in polyglycols. It has the formula given in Example 1.

Example 5

67 parts 3-(tri-iso-decyloxy)-propyl-1-amine are dissolved in 1000 parts water, with the addition of acetic acid, and the solution is adjusted to a pH value of 5.6. To this solution, there is slowly added, while stirring, a solution, in 1000 parts water, of the copper-phthalocyanine-sulphonic acid, substituted by hydroxypropylamide groups and obtained according to paragraph 2 of Example 1. The suspension obtained is further stirred at 50 to 60° C. for 1 to 2 hours and the product is filtered off with suction, washed with 1500 parts water and dried. The dyestuff obtained in excellent yield dissolves in 2

3000 parts water and slowly added to a solution of 49 parts 3-(2'-ethylhexoxy)-propyl-1-amine in 1000 parts water, which had been adjusted to pH 7.5 by means of acetic acid. The suspension obtained is further stirred at 50 to 60° C. for 1 to 2 hours. The product is then filtered off with suction and the filtered material is washed with water and dried. The dyestuff obtained in excellent yield is readily soluble in polyglycols and eminently suitable for the production of ball point pen pastes based on polyglycol. The dyestuff can be characterised by the following formula:

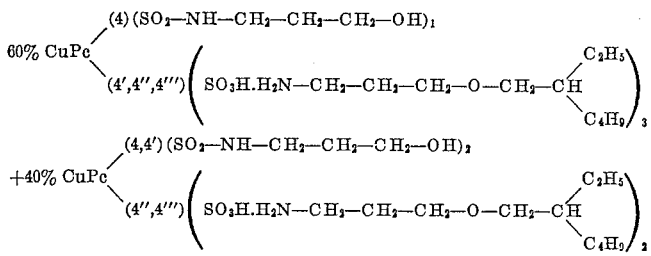

parts polyethylene glycol and is eminently suitable for the production of ball point pen pastes based on polyglycol. The dyestuff can be characterised by the following formula:

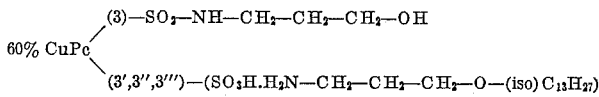

Example 6

96.7 parts copper-phthalocyanine-(4,4',4'',4''')-tetrasulphonic acid chloride (obtained from copper-phthalocyanine-(4,4',4'',4''')-tetrasulphonic acid or its sodium salt, chlorosulphonic acid and thionyl chloride at 80 to 85° C.) in the form of an aqueous paste, are slurried in 1500 parts ice water. 11 parts propanolamine and 0.5 part pyridine are then added. 1500 parts 1 N sodium hydroxide solution are slowly added, with stirring, while slowly raising the temperature to 20° C. and maintaining the pH value of the suspension at 8 to 9. When the sulphamide formation is completed, the reaction mixture is heated to 80° C. and the residual sulphonic acid chloride groups are hydrolysed with sodium hydroxide solution. To isolate the reaction product, the solution is stirred into dilute hydrochloric acid and the sulphonic acid is filtered off with suction, washed with dilute hydrochloric acid and dried.

The reaction product of paragraph 1 is dissolved in

Example 7

37 parts of an alkyl resin prepared from 42% castor oil, 39% phthalic anhydride and 19% glycerol, are mixed at 80 to 100° C. with 38 parts of a polyethylene glycol with an average molecular weight of 300 until the dispersion is satisfactory. 25 parts of the blue dyestuff produced according to Example 1 are dissolved in this mixture. The dyestuff solution thus prepared yields an excellent ball point pen paste which is fast to light.

Example 8

(a) If in the procedure described in Example 1 there are used 8 parts of propanolamine-(1,3) and 56 parts of 3-(2'-ethylhexoxy)-propyl-1-amine then there is obtained a dyestuff of the folowing formula in good yields:

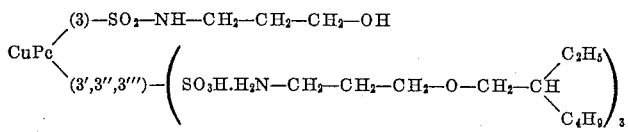

This dyestuff has an excellent solubility in polyethylene glycol.

(b) If the process described in Example 8(a) is carried out by using 6 parts of ethanolamine respectively in a second procedure 9.5 parts of 3-aminobutanol-1 instead of 8 parts of propanolamine then there are obtained dyestuffs of the following formulae:

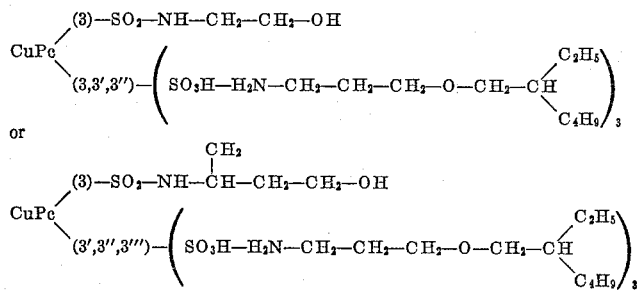

The dyestuffs show an excellent solubility in polyethylene glycol.

Example 9

(a) If in the process described in Example 1 there are used 16 parts of propanolamine-(1,3) and 37 parts of 3-(2'-ethylhexoxy)-propylamine-1 then there is obtained in good yield the dyestuff of the formula:

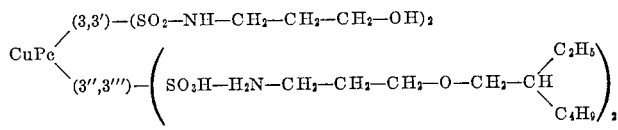

The dyestuff shows an excellent solubility in polyethylene glycol.

(b) If the process described in Example 9(a) is carried out by using 12 parts of ethanolamine respectively in a second procedure 14 parts of 3-aminobutanol-1 instead of the 16 parts of propanolamine-1 then the following dyestuffs are obtained:

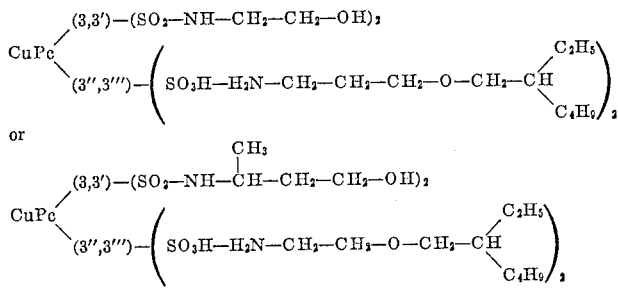

The dyestuffs show an excellent solubility in polyethylene glycol.

What we claim is:
1. A phthalocyanine dyestuff of the formula:

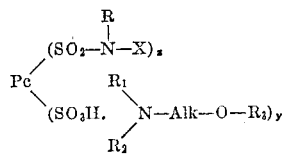

wherein Pc is a metal-containing phthalocyanine radical, wherein the metal is copper, nickel, or cobalt, R is a hydrogen atom, a lower alkyl or lower hydroxy-alkyl group, X is a hydroxyalkyl group of 2 to 6 carbon atoms, $z$ is 1 or 2, $y$ is 1, 2 or 3, $R_1$ and $R_2$, which may be the same or different, are hydrogen atoms or lower alkyl radicals, Alk is an alkylene chain containing two or three carbon atoms and $R_3$ is an alkyl radical containing six to fourteen carbon atoms.

2. Dyestuff of the formula:

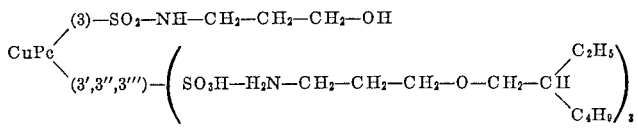

3. Dyestuff of the formula:

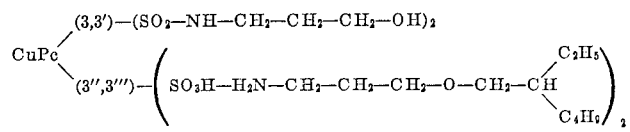

4. Dyestuff of the formula:

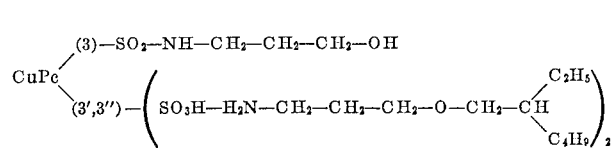

5. Dyestuff of the formula:

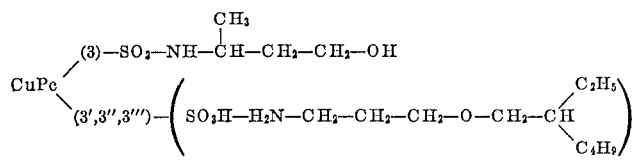

6. Dyestuff of the formula:
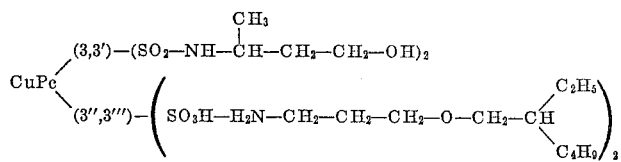
References Cited
UNITED STATES PATENTS
3,082,213 3/1963 Pugin et al. _____ 260—314.5
3,057,873 10/1962 Pugin et al. _____ 260—314.5
WALTER A. MODANCE, *Primary Examiner.*
H. I. MOATZ, *Assistant Examiner.*

UNITED STATES PATENT OFFICE
CERTIFICATE OF CORRECTION

Patent No. 3,365,463                                        January 23, 1968

Manfred Groll et al.

It is hereby certified that error appears in the above numbered patent requiring correction and that the said Letters Patent should read as corrected below.

Column 5, line 43, "1500" should read -- 150 --. Column 6, line 26, "alkyl" should read -- alkyd --. Column 6, Example 8(b), Column 7, Example 9(a), Example 9(b), Column 8, Claims 2, 3, 4 and 5, that portion of the formula reading "$SO_3H-H_2N$", each occurrence, should read -- $SO_3H.H_2N$ --.

Column 8, lines 44 to 46, the left-hand portion of the formula should appear as shown below:

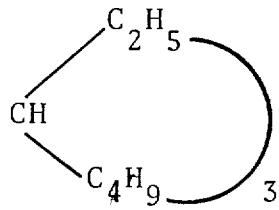

Signed and sealed this 30th day of September 1969.

(SEAL)
Attest:

EDWARD M. FLETCHER, JR.                             WILLIAM E. SCHUYLER, JR
Attesting Officer                                      Commissioner of Patents